United States Patent
Capoldi

(10) Patent No.: US 11,391,322 B2
(45) Date of Patent: Jul. 19, 2022

(54) ROLLING BEARING, IN PARTICULAR, A LARGE-DIAMETER ROLLING BEARING

(71) Applicant: AKTIEBOLAGET SKF, Gothenburg (SE)

(72) Inventor: Bruno Capoldi, Charentenay (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/101,274

(22) Filed: Nov. 23, 2020

(65) Prior Publication Data
US 2021/0246941 A1    Aug. 12, 2021

(30) Foreign Application Priority Data

Feb. 11, 2020 (DE) .......................... 102020201707.7

(51) Int. Cl.
*F16C 19/06*     (2006.01)
*F16C 33/60*     (2006.01)

(52) U.S. Cl.
CPC .............. *F16C 19/06* (2013.01); *F16C 33/60* (2013.01); *F16C 2300/14* (2013.01)

(58) Field of Classification Search
CPC .......... F16C 19/06; F16C 33/60; F16C 43/04; F16C 2300/14
See application file for complete search history.

(56) References Cited

U.S. PATENT DOCUMENTS

| | | | | |
|---|---|---|---|---|
| 3,888,357 A | * | 6/1975 | Bauer | B66C 23/84 212/175 |
| 4,746,232 A | * | 5/1988 | Gugel | F16C 19/362 384/619 |
| 4,789,254 A | * | 12/1988 | Marquardt | F16C 19/18 384/611 |
| 6,866,423 B2 | * | 3/2005 | Faltus | F16C 35/06 384/559 |
| 2017/0254359 A1 | * | 9/2017 | Maiwa | F16C 19/184 |

FOREIGN PATENT DOCUMENTS

| | | | | |
|---|---|---|---|---|
| DE | 962125 C | * | 4/1957 | .............. F16C 33/61 |
| DE | 102014106587 B4 | * | 6/2019 | .............. F03D 80/70 |
| JP | 2521914 Y2 | * | 1/1997 | ............. F16C 19/505 |
| JP | 2013204678 A | * | 10/2013 | .............. F16C 33/60 |

\* cited by examiner

*Primary Examiner* — Phillip A Johnson
(74) *Attorney, Agent, or Firm* — J-TEK Law PLLC; Scott T. Wakeman; Mark A. Ussai

(57) ABSTRACT

A bearing includes first and second rings and a plurality of rolling elements supporting the rings for relative rotation. At least the first ring is an axially split ring formed from a first part and a second part stacked against other in the axial direction. The first part includes first tapered through-holes and the second part includes second tapered through-holes axially aligned with the first tapered through-holes, and a plurality of taper pins extend in the aligned tapered through-holes of the first and second parts. Each of the taper pins has a threaded end portion, each of the taper pins contacts the first and second tapered through-holes, and a plurality of nuts are screwed onto the threaded end portions of the taper pins.

10 Claims, 3 Drawing Sheets

ROLLING BEARING, IN PARTICULAR, A LARGE-DIAMETER ROLLING BEARING

CROSS-REFERENCE

This application claims priority to German patent application no. 10 2020 201 707.7 filed on Feb. 11, 2020, the contents of which are fully incorporated herein by reference.

TECHNOLOGICAL FIELD

The present disclosure relates to the field of bearings, and, in particular to the field of large-diameter rolling element bearings having an inner ring and an outer ring arranged concentrically about an axis of rotation that extends in an axial direction.

BACKGROUND

Large-diameter rolling bearings may be used for example in tunnel boring machines, in a mining extraction machines or in wind turbines. Large-diameter rolling bearings may also be used in the field of defense such as in radars, tanks, or excavator applications.

A large-diameter rolling bearing comprises two concentric inner and outer rings, and at least one row of rolling elements arranged between the rings.

In order to allow the transport, and/or the assembly of the bearing on the corresponding machine, the inner and outer rings of the rolling bearing may be split into at least two partial or part rings stacked on each other in the axial direction. To this end, each part ring may also be split into a plurality of successive circumferential ring segments.

Therefore, after delivery, the several parts of each inner and outer ring must be joined together to assemble a split-ring.

However, during assembly of the inner or outer split-ring, small misalignments may occur between the part rings. In this case, the assembly process of the rolling bearing must be interrupted until the part rings can be disassembled and then realigned.

This adjustment step may be laborious, interrupts the assembly process and leads to increased costs of the overall rolling bearing.

SUMMARY

One aspect of the present disclosure is to overcome these drawbacks.

The disclosure is directed to a bearing comprising a first ring and a second ring capable of rotating concentrically relative to one another, at least the first ring being split in at least first and second parts stacked one relative to the other in the axial direction.

According to another aspect, the rolling bearing further comprises a plurality of taper pins each extending into aligned through-holes of the first and second parts of the first ring. The rolling bearing also comprises a plurality of nuts screwed onto the taper pins.

According to another aspect, each of the aligned through-holes has at least one tapered portion in contact with the associated taper pin.

Thanks to the invention, if during an assembly of a first ring there are small misalignments between the through-holes of the first and second parts, these parts can be realigned by mounting the taper pins into the holes and tightening the nuts.

Each pin may be provided with a threaded part onto which an associated nut can be screwed, and a smooth tapered portion that can extend into the tapered portions of the associated aligned through-holes of the first and second parts of the first ring. The terms "smooth" is understood to mean threadless or lacking screw threads.

The nuts may axially come into contact against a frontal face of the first ring. Alternatively, the nuts may be axially recessed with respect to a frontal surface of the first ring.

In one embodiment, at least one of the first and second parts of the first ring is further split into a plurality of successive circumferential ring segments. Preferably, each of the first and second parts is further split into a plurality of successive circumferential ring segments.

According to a further aspect, each pair of facing ends of two successive ring segments of the first part of the first ring is circumferentially offset with respect to the pairs of facing ends of the successive ring segments of the second part of the first ring.

In one embodiment, at least one of the first and second parts of the first ring may be made into one part.

Preferably, the first and second parts are secured together only with the taper pins and the nuts.

In one embodiment, the rolling element bearing further comprises at least one row of rolling elements interposed between raceways of the first and second rings.

The disclosure is also directed to a ring for a bearing that is split into at least first and second parts stacked relative to each other in the axial direction.

The ring further comprises a plurality of taper pins each extending into aligned through-holes of the first and second parts, and a plurality of nuts screwed onto the taper pins, each of the aligned through-holes having at least a tapered portion in contact with the associated taper pin.

The ring may be the inner or the outer ring of the bearing. The ring may also be a sealing ring or other type of ring intended to form a part of and/or be used with a bearing.

BRIEF DESCRIPTION OF THE DRAWINGS

The present invention and its advantages will be better understood by studying the detailed description of specific embodiments given by way of non-limiting examples and illustrated by the appended drawings in which.

DETAILED DESCRIPTION

Figure 1:
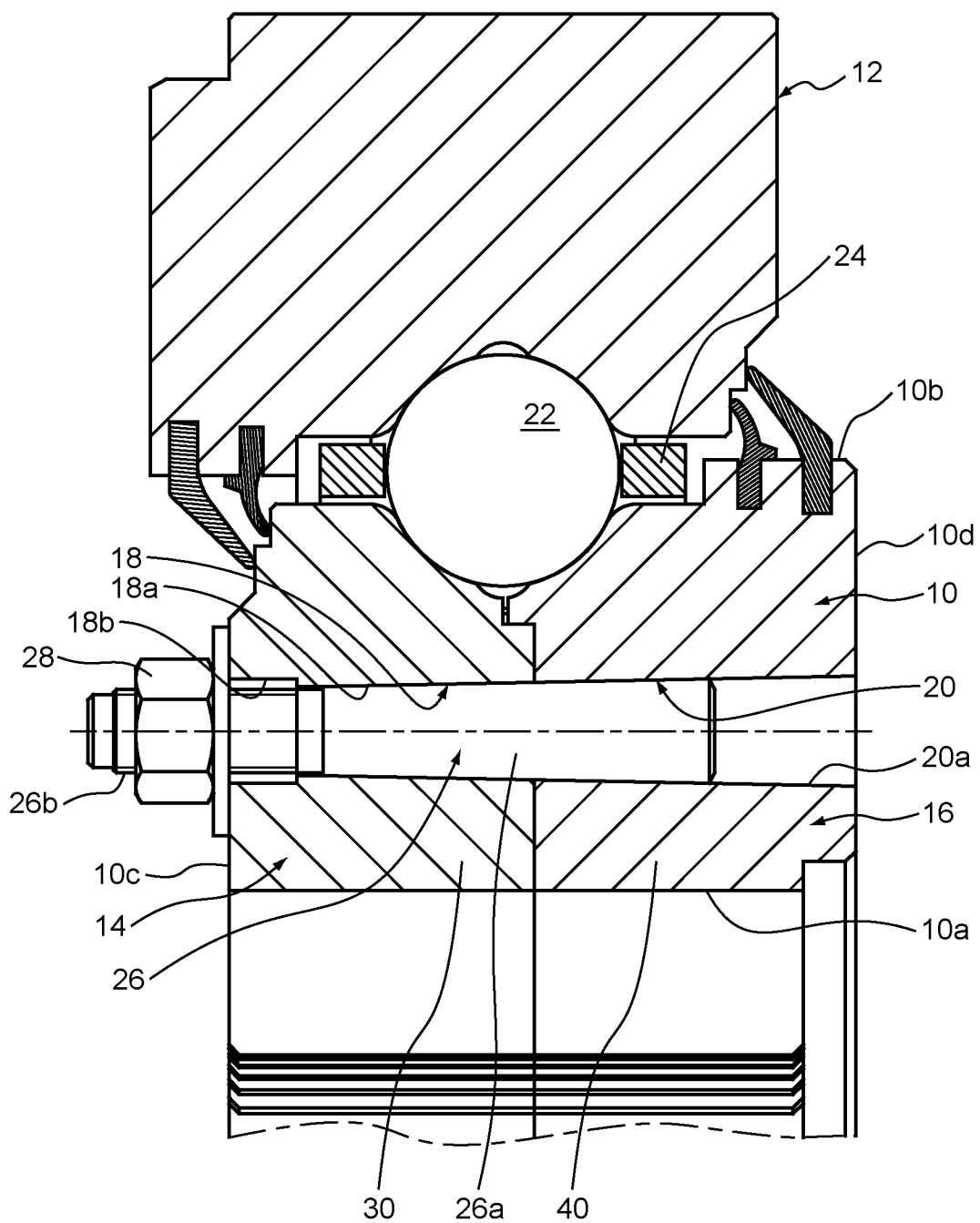
FIG. 1 is a partial cross-section of a rolling bearing according to a first embodiment of the disclosure.

The rolling bearing illustrated in FIG. 1 is a large-diameter rolling bearing, for example, a bearing having a diameter of at least one meter, comprising a first ring 10 and a second ring 12. In the illustrated example, the first ring 10 is the inner ring whereas the second ring 12 is the outer ring. In this example, the inner ring 10 is configured to rotate and the outer ring 12 is configured to be fixed. The rolling bearing may for example be used in a tunnel boring machine, a wind turbine or any other applications using a large diameter rolling bearing.

The inner and outer rings 10, 12 are concentric and extend axially along the bearing rotation axis (not shown) which runs in an axial direction. The rings 10, 12 are of the solid type.

The inner ring 10 is formed as a split ring and comprises a first part 14 and a second part 16 stacked one relative to the other in the axial direction.

As will be described later, each of the first and second parts 14, 16 (or part rings) of the inner ring 10 is provided with a plurality of aligned through-holes 18, 20. Each pair of aligned through-holes 18, 20 extend axially.

The rolling bearing also comprises a row of rolling elements 22, which are provided here in the form of balls, mounted between the inner and outer rings 10, 12. The rolling bearing further comprises a cage 24 for maintaining the regular circumferential spacing of the rolling elements 22.

The inner ring 10 comprises a cylindrical bore 10a and an opposite outer cylindrical surface 10b from which a toroidal circular raceway (not referenced) for the rolling elements 22 is formed, said raceway being directed radially outwards. The bore 10a is provided with a gear teeth (not referenced).

The inner ring 10 further comprises two opposite radial frontal lateral faces 10c, 10d which axially delimit the bore 10a and the outer surface 10b of said ring. The lateral faces 10c, 10d delimit the axial thickness of the inner ring 10. As previously mentioned, the inner ring 10 is divided in the axial direction in two separate parts, the first part 14 and the second part 16. The first part 14 delimits the lateral face 10c while the second part 16 delimits the lateral face 10d. Here, the first and second parts 14, 16 delimit together the raceway for the rolling elements 22.

The rolling bearing further comprises a plurality of attachment bolts or pins 26 each extending into two aligned through-holes 18, 20 of the inner ring, and a plurality of nuts 28 screwed onto the pins. The pins 26 are distributed around the circumference of the inner ring 10. Preferably, the pins 26 are equally angularly spaced with respect to each other. The pins 26 are identical to each other. Since the through-holes 18, 20 and the pins 26 are identical, only one of them will be described herein.

The pin 26 has a smooth (e.g., not threaded) tapered portion 26a that extends inside both of the two aligned through-holes 18, 20, and a threaded portion 26b onto which an associated nut 28 can be screwed. The tapered portion 26a radially comes into contact with the through-holes 18, 20. The threaded portion 26b extends axially from the tapered portion 26a. The threaded portion 26b has a cylindrical form. In the disclosed example, the threaded portion 26b of the pin axially protrudes with respect to the frontal face 10c of the inner ring.

The through-hole 20 of the second part 16 of the inner ring extends axially. The through-hole 20 extends axially from the frontal face 10d of the second part 16, and opens on an opposite frontal face (not referenced) of the second part in axial contact with the first part 14. The through-hole 20 comprises a tapered portion 20a extending axially from the frontal face 10d to this opposite frontal face. In the disclosed example, the through-hole 20 only comprises the tapered portion 20a. Alternatively, the through-hole 20 may also comprise a cylindrical portion extending axially from the tapered portion 20a and opening on the frontal face 10d. The inner diameter of the tapered portion 20a decreases towards the first part 14 of the inner ring.

The through-hole 18 of the first part 14 of the inner ring extends axially. The through-hole 18 extends axially from the frontal face 10c of the first part 14, and opens on an opposite frontal face (not referenced) of the first part in axial contact with the second part 16. The through-hole 18 comprises a tapered portion 18a extending axially from the frontal face of the first part 14 in axial contact with the second part 16. The tapered portion 18a radially faces the tapered portion 20a of the through-hole 20. The tapered portion 18a extends axially the tapered portion 20a. The through-hole 18 also comprises a cylindrical portion 18b extending axially the tapered portion 18a and opening on the frontal face 10c.

The tapered portion 26a of the pin extends both into the tapered portions 18a, 20a of the through-holes 18, 20. The tapered portion 26a of the pin radially comes into contact with the tapered portions 18a, 20a of the through-holes. The threaded portion 26b of the pin extends into the cylindrical portion 18b of the through-hole 18. Here, the threaded portion 26b axially protrudes outside with respect to the first part 14 of the inner ring.

The nut 28 is screwed on the threaded portion 26b of the pin. The nut 28 is located outside of the inner ring 10. The nut 28 axially bears against the frontal face 10c of the inner ring with interposition of a washer (not referenced).

Figure 2:
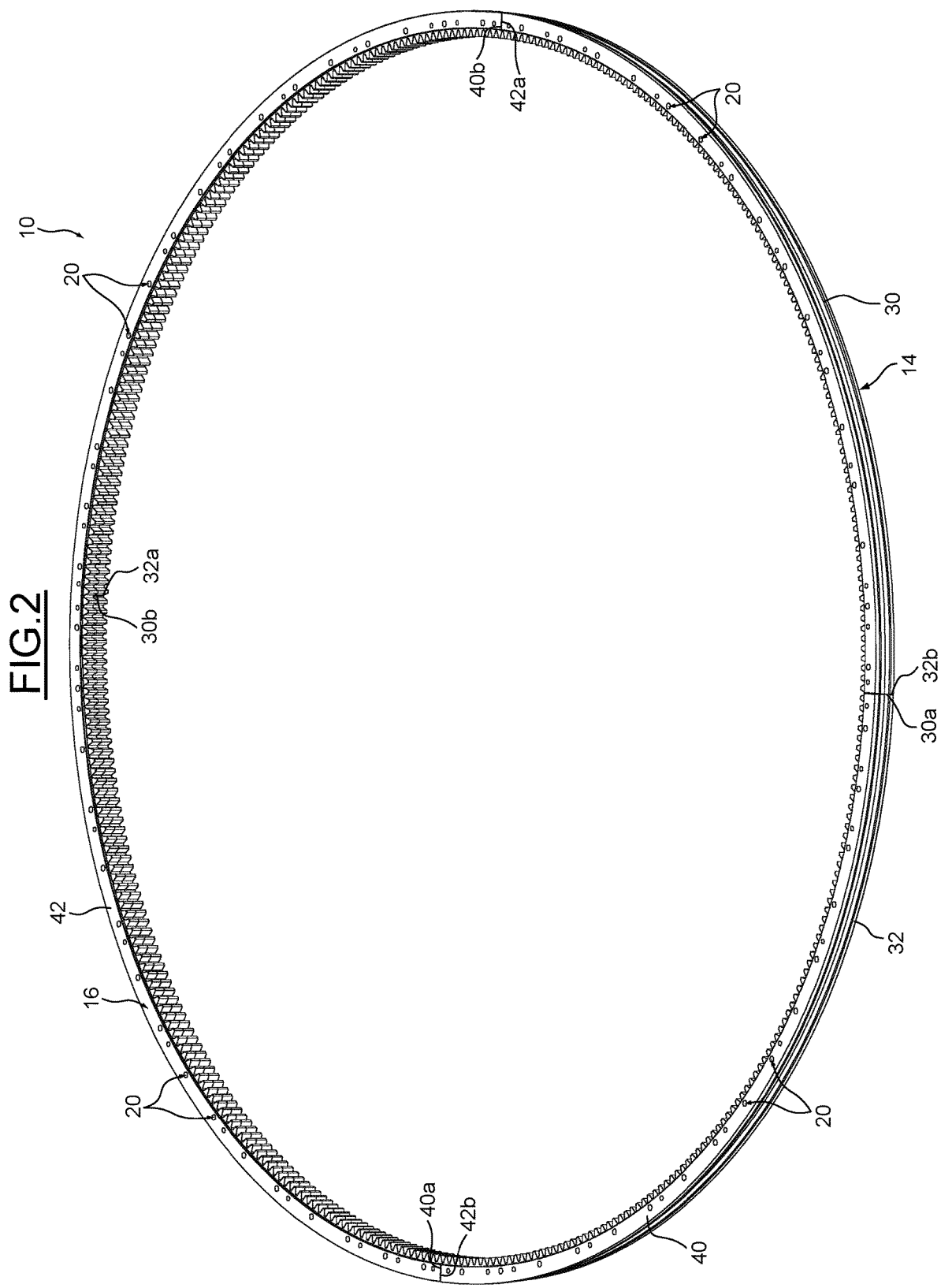
FIG. 2 is a perspective view of the inner ring of the rolling bearing of FIG. 1.

As shown on FIG. 2, the first part 14 of the inner ring is segmented and is formed by successive circumferential ring segments 30, 32.

The ring segments 30, 32 forming the first part 14 of the inner ring are identical one to another. Each ring segment 30, 32 comprises a first end 30a, 32a and a second end 30b, 32b which delimit said ring segment in the circumferential direction. The first end 30a, 32a of the ring segment 30, 32 faces in the circumferential direction the second end 32b, 30b of the successive ring segment.

The second part 16 of the inner ring is also formed by successive circumferential ring segments 40, 42. The ring segments 40, 42 are identical one to another. Similarly to the first part 14, each ring segment 40, 42 comprises a first end 40a, 42a and a second end 40b, 42b which delimit said ring segment in the circumferential direction. The first end 40a, 42a of the ring segment 40, 42 faces in the circumferential direction the second end 42b, 40b of the successive ring segment.

In the disclosed embodiment, each of the first and second parts 14, 16 are formed by two successive ring segments. Alternatively, it could be possible for the first part 14 and/or the second part 16 to have a different number of successive ring segments, for example at least three ring segments.

The ring segments 30, 32 of the first part 14 and the ring segments 40, 42 of the second part 16 are arranged in an offset position such that each pair of facing first and second ends of the ring segments 30, 32 is circumferentially offset with respect to the pairs of facing first and second ends of the ring segments 40, 42. In the disclosed example, each pair of facing first and second ends of the ring segments 30, 32 of the first part is located at the middle of one of the ring segments 40, 42 of the second part which is adjacent in the axial direction.

As previously mentioned, in this first example, the first ring 10 split in the first and second parts 14, 16 is the inner ring whereas the second ring 12 is the outer ring.

Figure 3:
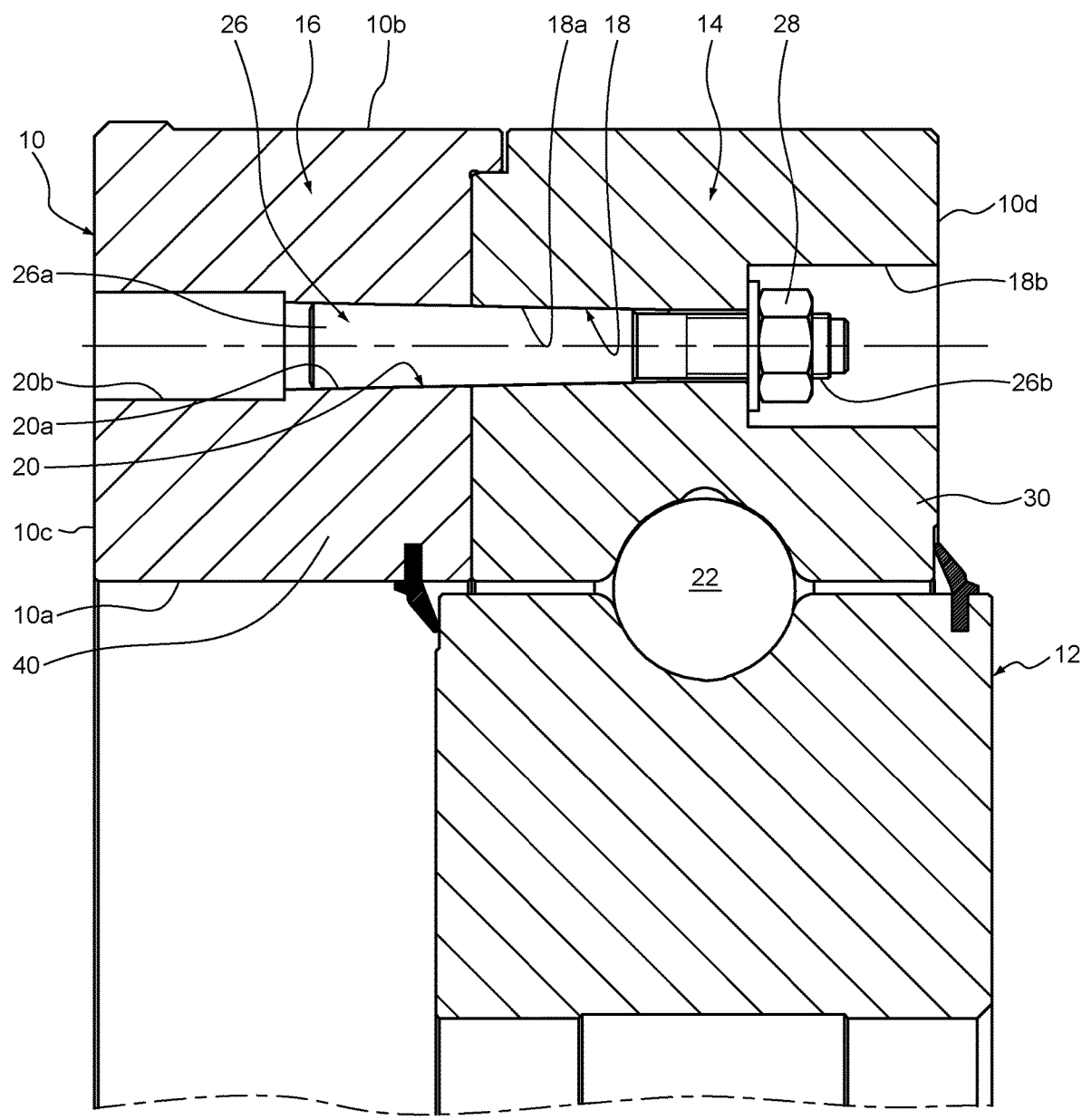
FIG. 3 is a partial cross-section of a rolling bearing according to a second embodiment of the disclosure.

As an alternative, it is possible to provide a reversed arrangement with the first ring split into the first and second parts 14, 16 forming the outer ring 10 as illustrated on FIG. 3.

In this second example, the nut 28 screwed onto each pin 26 is located inside a cylindrical portion 18b of the associated through-hole 18. The nut 28 axially bears against the radial shoulder formed between the cylindrical portion 18b and the tapered portion 18a of the associated through-hole 18.

In this example, each though-hole 20 of the second part 16 is provided with a cylindrical portion 20*b* extending axially the tapered portion 20*a* and opening on the frontal face 10*d* of the outer ring.

In the illustrated examples, the rolling bearing only have one ring split in first and second parts secured together by tapered pins. As an alternative, both the inner and outer rings could be formed as such split rings.

In the described examples, the rolling bearing is provided with one row of rolling elements. Alternatively, the rolling bearing may comprise at least two rows of rolling elements. In the illustrated example, the rolling elements are balls. The rolling bearing may comprise other types of rolling elements, for example rollers. In another variant, the bearing may also be a sliding bearing having no rolling elements.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved large diameter rolling bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A bearing comprising:
   a first ring and a second ring and a plurality of rolling elements supporting the first and second rings for relative concentric rotation, at least the first ring being an axially split ring comprising a first part and a second part stacked against other in the axial direction, the first part including first tapered through-holes and the second part including second tapered through-holes axially aligned with the first tapered through-holes,
   a plurality of taper pins each extending in the aligned tapered through-holes of the first and second parts, each of the taper pins having a threaded end portion, and each of the taper pins contacting the first and second tapered through-holes, and
   a plurality of nuts screwed onto the threaded end portions of the taper pins.

2. The bearing according to claim 1,
   wherein each of the taper pins includes a smooth tapered portion extending from the threaded end portion, and
   wherein the smooth tapered portions of each of the taper pins are located in both the first and second tapered through-holes.

3. The bearing according to claim 2, wherein the nuts axially contact an axial face of the first ring.

4. The bearing according to claim 2, wherein the nuts are axially recessed in an axial face of the first ring.

5. The bearing claim 1, wherein the first part of the first ring comprises a plurality of first circumferential ring segments, each adjacent pair of the first circumferential ring segments meeting at a first joint.

6. The bearing according to claim 5, wherein the second part of the first ring comprises a plurality of second circumferential ring segments, each adjacent pair of the second circumferential ring segments meeting at a second joint.

7. The bearing according to claim 6, wherein the first joints are circumferentially offset from the second joints.

8. The bearing according to claim 1, wherein the first and second parts are secured together only with the taper pins and the nuts.

9. The bearing according to claim 1,
   wherein the threaded end portions of the plurality of taper pins are located axially outside the first part and the second part.

10. The bearing according to claim 1,
    wherein the plurality of nuts are located axially outside the first part and the second part.

* * * * *